US011091619B2

(12) United States Patent
Miller et al.

(10) Patent No.: US 11,091,619 B2
(45) Date of Patent: Aug. 17, 2021

(54) HIGH MOLECULAR WEIGHT POLYMERS HAVING IMPROVED CRYSTALLIZATION

(71) Applicant: BRASKEM AMERICA, INC., Philadelphia, PA (US)

(72) Inventors: W. Scott Miller, Pittsburgh, PA (US); Gustavo A. Guzman Cardozo, Pittsburgh, PA (US)

(73) Assignee: BRASKEM AMERICA, INC., Philadalephia, PA (US)

( * ) Notice: Subject to any disclaimer, the term of this patent is extended or adjusted under 35 U.S.C. 154(b) by 203 days.

(21) Appl. No.: 16/219,490

(22) Filed: Dec. 13, 2018

(65) Prior Publication Data

US 2019/0185650 A1 Jun. 20, 2019

Related U.S. Application Data

(62) Division of application No. 62/599,405, filed on Dec. 15, 2017.

(51) Int. Cl.
*C08L 23/12* (2006.01)
*C08L 23/10* (2006.01)
*C08L 23/16* (2006.01)
*C08L 23/14* (2006.01)
*C08F 210/06* (2006.01)
*C08F 110/06* (2006.01)

(52) U.S. Cl.
CPC .......... *C08L 23/142* (2013.01); *C08F 110/06* (2013.01); *C08F 210/06* (2013.01); *C08F 2500/01* (2013.01); *C08F 2500/12* (2013.01); *C08L 2203/18* (2013.01); *C08L 2205/02* (2013.01); *C08L 2308/00* (2013.01); *C08L 2314/02* (2013.01)

(58) Field of Classification Search
None
See application file for complete search history.

(56) References Cited

U.S. PATENT DOCUMENTS

| 6,433,087 B1 * | 8/2002 | Ebner ................. C08F 297/083 525/191 |
| 2003/0096895 A1 | 5/2003 | Zhao et al. |
| 2014/0128549 A1 | 5/2014 | Kheirandish et al. |
| 2017/0233566 A1 | 8/2017 | Datta et al. |

* cited by examiner

*Primary Examiner* — Michael J Feely
(74) *Attorney, Agent, or Firm* — Jeffrey N. Townes; Cozen O'Connor

(57) ABSTRACT

This disclosure relates to a high molecular weight polypropylene-based composition with high nucleation density and short crystallization half time. The composition may contain up to about 2 wt % ethylene.

28 Claims, 2 Drawing Sheets

HIGH MOLECULAR WEIGHT POLYMERS HAVING IMPROVED CRYSTALLIZATION

This application claims priority to U.S. Provisional Application No. 62/599,405, filed on Dec. 15, 2017, which is herein incorporated by reference in its entirety.

FIELD OF THE INVENTION

This invention relates generally to high molecular weight polypropylene-based compositions, more particularly, polypropylene-based compositions with improved crystallization behavior.

BACKGROUND

Crystallization kinetics of polymers can affect their material properties. A polymer composition with fast crystallization kinetics can thus provide high nucleation densities and small crystals, which can then provide enhanced material properties (e.g., improved creep, clarity/haze, ductility, and melt strength). Nucleation in polymer compositions is often sped up with nucleating agents or low molecular weight compounds that are blended in during processing.

Therefore, there is an unmet need in the art to produce a polymer composition in which more nucleation sites can be achieved by tailoring the polymer composition, without the use of external nucleators. It is a further object of the current invention to produce a polymer composition with fast crystallization kinetics and enhanced material properties.

SUMMARY OF THE INVENTION

One aspect of the invention relates to a high molecular weight polypropylene-based composition, containing from 0 to about 2% by weight ethylene, where the composition has a melt flow rate of about 1.0 g/10 min or lower, and where the composition has a nucleation density greater than 18,000 nuclei/cm$^2$, when nuclei are grown from a melt at 135° C. without the addition of an external nucleating agent, as measured by optical microscopy.

Another aspect of the invention relates to a high molecular weight polypropylene-based composition formed by a process including: (1) polymerizing propylene and ethylene with a Ziegler-Natta catalyst system in a first loop reactor to form a high molecular weight polypropylene-polyethylene copolymer, (2) polymerizing propylene with the Ziegler-Natta catalyst system in a second loop reactor to form an average molecular weight polypropylene polymer, and (3) extruding the high molecular weight polypropylene-based composition, where the composition comprises from about 0.10% to about 0.5% by weight ethylene, where the composition has a melt flow rate of about 1.0 g/10 min or lower, and where the composition has a nucleation density greater than 18,000 nuclei/cm$^2$, when nuclei are grown from a melt at 135° C. without the addition of an external nucleating agent, as measured by optical microscopy.

Another aspect of the invention relates to a high molecular weight polypropylene-based composition formed by a process including: (1) polymerizing propylene with a Ziegler-Natta catalyst system in a first loop reactor, to form a high molecular weight polypropylene polymer, (2) polymerizing propylene with the Ziegler-Natta catalyst system in a second loop reactor, to form an average molecular weight polypropylene polymer, (3) optionally polymerizing propylene and ethylene with a Ziegler-Natta catalyst system in a gas phase reactor, to form an average molecular weight polypropylene-polyethylene copolymer, and (4) extruding the high molecular weight polypropylene-based composition, where the composition comprises from 0 to about 2% by weight ethylene, where the composition has a melt flow rate of about 1.0 g/10 min or lower, and where the composition has a nucleation density greater than 18,000 nuclei/cm$^2$, when nuclei are grown from a melt at 135° C. without the addition of an external nucleating agent, as measured by optical microscopy.

DETAILED DESCRIPTION OF THE INVENTION

Figure 1:
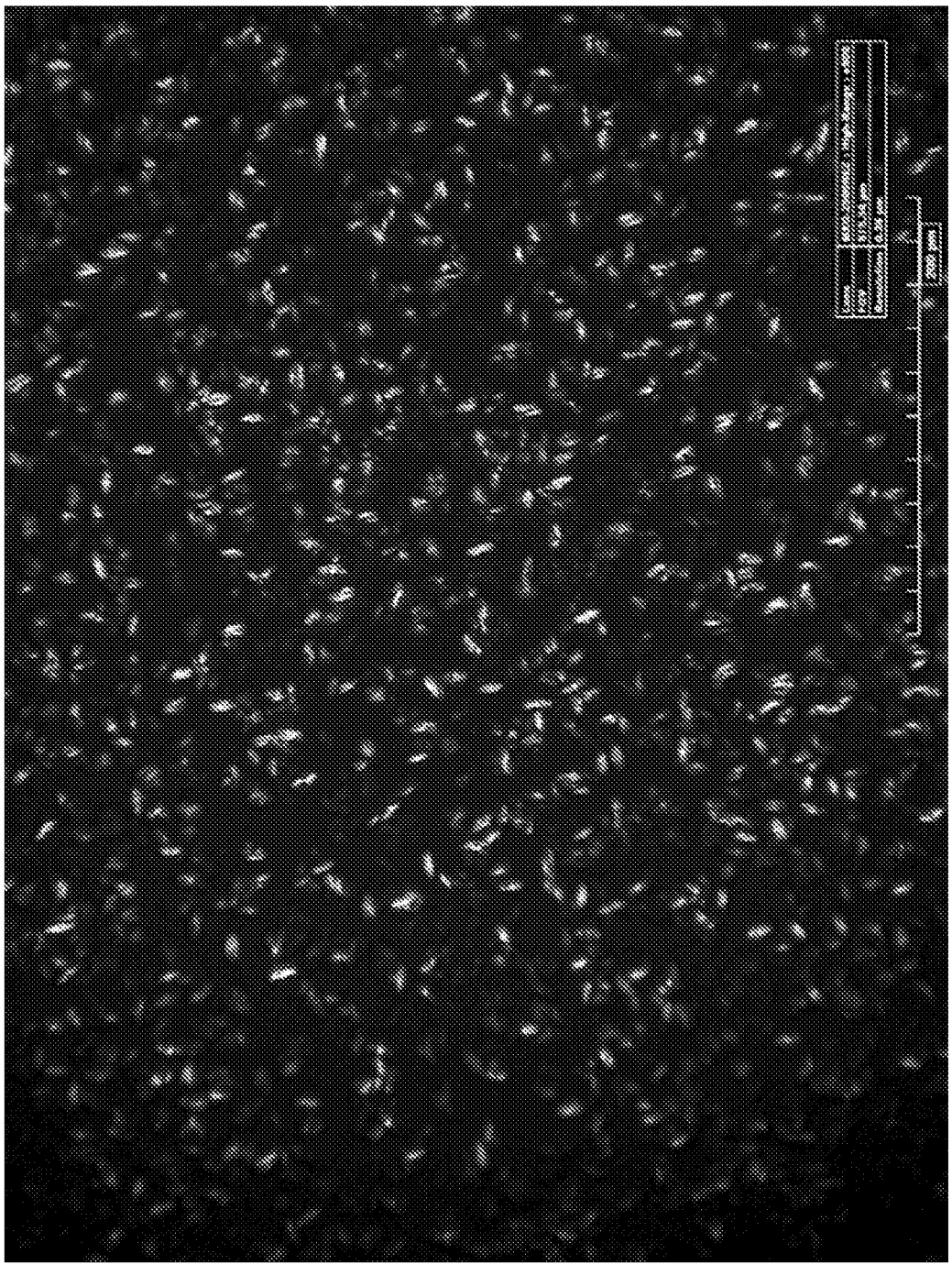
FIG. 1 is an optical micrograph showing the cylindritic crystals formed in Example 1.

The present disclosure relates to a high molecular weight polypropylene-based composition with high nucleation density. In particular, the high molecular weight polypropylene-based composition comprises from about 0 to about 2 wt % ethylene. It was surprisingly found that the nucleation density can be significantly increased by carefully tailoring the polymer composition. Accordingly, one aspect of the invention relates to a high molecular weight polypropylene-based composition, containing from 0 to about 2% by weight ethylene, where the composition has a melt flow rate of about 1.0 g/10 min or lower, and where the composition has a nucleation density greater than 18,000 nuclei/cm$^2$, when nuclei are grown from a melt at 135° C. without the addition of an external nucleating agent, as measured by optical microscopy.

As used herein, a high molecular weight polypropylene-based composition refers to a composition comprising a high molecular weight polypropylene homopolymer or a high molecular weight polypropylene-polyethylene copolymer. The high molecular weight polypropylene-based composition also comprises an average molecular weight polypropylene homopolymer or an average molecular weight polypropylene-polyethylene copolymer. The polypropylene-based composition may have a weight average molecular weight ($M_w$) ranging from 500,000 g/mol to 3,000,000 g/mol, or from about 800,000 g/mol to about 2,000,000 g/mol. In one embodiment, where the high molecular weight polypropylene-based composition comprises a high molecular weight polypropylene-polyethylene copolymer, the composition also includes an average molecular weight polypropylene homopolymer. In one embodiment, where the high molecular weight polypropylene-based composition comprises a high molecular weight polypropylene homopolymer and an average molecular weight polypropylene homopolymer, the composition also includes an average molecular weight polypropylene-polyethylene copolymer. The composition can also include modifications as well as other components one skilled in the art would typically include in a polypropylene-based composition.

The ethylene content of the high molecular weight polypropylene-based composition ranges from about 0 to about 2 wt % ethylene, including all fraction and integer ranges therebetween. For example, the ethylene content can be from about 0.1 wt % to about 1.0 wt %, from about 0.1 wt % to about 0.5 wt %, from about 0.1 wt % to about 0.35 wt %, or about 0.3 wt %. In another embodiment, the ethylene content is from about 0.5 wt % to about 2 wt %, or about 0.5 wt %. The ethylenes may be present in the polypropylene-polyethylene copolymer or exist as polyethylene homopolymer.

Conversely, the high molecular weight polypropylene-based composition comprises from about 98-100 wt % propylene content, including all fraction and integer ranges therebetween. For example, the propylene content is from about 99.0 wt % to about 99.9 wt %, from about 99.5 wt % to about 99.9 wt %, or about 99.7 wt %. In another embodiment, the propylene content is from about 98 wt % to about 99.5 wt %, or about 99.5 wt %.

In some embodiments, the high molecular weight polypropylene-polyethylene copolymer has a melt flow rate of less than about 0.1 g/10 min, or from about 0.06 g/10 min to about 0.1 g/10 min, when measured with a 2.16 kg melt indexer weight, or a melt flow rate of less than about 0.3 g/10 min, or from about 0.12 g/10 min to about 0.24 g/10 min, when measured with a 5 kg melt indexer weight. In one embodiment, the high molecular weight polypropylene homopolymer has a melt flow rate of about 0.2 g/10 min or less, or about 0.2 g/10 min, when measured with a 5 kg melt indexer weight. The melt flow rate is measured at 230° C. in accordance with ASTM 1238 with 1% antioxidant butylated hydroxytoluene (BHT) to stabilize powder melt flows.

Overall, the high molecular weight polypropylene-based composition has a melt flow rate of about 1.0 g/10 min or less, or from about 0.1 g/10 min to about 0.4 g/10 min, or from about 0.3 g/10 min to about 0.5 g/10 min, when measured with a 2.16 kg melt indexer weight.

As used herein, the term "nucleation density" refers to the number of crystal nuclei in an area of 1 cm$^2$. In some embodiments, the crystal nuclei are crystallization seeds that provide nucleation sites for the polymer chains. The nucleation density can be measured by methods known to one skilled in the art. For example, an optical microscope, such as a binocular stereoscopic microscope, a brightfield microscope, a polarizing microscope, or a confocal microscope, optionally equipped with a hot stage, can be used for measuring nucleation density. In one embodiment, the optical microscope is a confocal microscope equipped with crossed polarizers and a digital camera.

The high molecular weight polypropylene-based composition has a nucleation density greater than 18,000 nuclei/cm$^2$, greater than 20,000 nuclei/cm$^2$, greater than 75,000 nuclei/cm$^2$, greater than 100,000 nuclei/cm$^2$, or greater than 125,000 nuclei/cm$^2$, when the nuclei are grown from a melted composition at 135° C., without the addition of an external nucleating agent. The nucleation density is typically not more than 1,000,000 nuclei/cm$^2$. In other embodiments, when the nuclei are grown from a melted composition at 120° C., the nucleation density is greater than 100,000 nuclei/cm$^2$, greater than 500,000 nuclei/cm$^2$, or greater than 1,000,000 nuclei/cm$^2$, with the nucleation density at that temperature typically not more than 10,000,000 nuclei/cm$^2$. The high nucleation density can thus lead to the formation of more crystals.

As used herein, the term "crystallization half time" refers to the time at which the extent of crystallization has reached about 50%. Crystallization half time is measured from (a) the point in time the sample reaches the desired isothermal temperature (e.g., 120° C. or 135° C.) to (b) the point in time at which the sample reaches the peak heat flow. Alternatively, for fast crystallizing samples, crystallization half time is measured from the point in time at which the sample experiences minimum heat flow when cooling from the melt to peak crystallization heat flow. The crystallization half time can be measured by methods known to one skilled in the art, for example, by isothermal differential scanning calorimetry.

When the nuclei are grown from a melted composition at 135° C., the high molecular weight polypropylene-based composition typically has a crystallization half time of about 24 minutes or shorter, about 20 minutes or shorter, about 15 minutes or shorter, or about 10 minutes or shorter. When the nuclei are grown from a melted composition at 120° C., the crystallization half time is typically less than about a minute, from about 0.1 minute to about 0.9 minute, from about 0.1 minute to about 0.7 minute, or from about 0.1 minute to about 0.5 minute.

There are several advantages associated with the high molecular weight polypropylene-based composition having fast crystallization kinetics without an external nucleating agent. Firstly, cycle times can be reduced in polymer processing such as extrusion or molding. Secondly, because the step of adding the external nucleating agent is eliminated, there are savings in costs and time. Thirdly, fabricated parts made from the high molecular weight polypropylene-based composition may also solidify faster, thereby increasing the rate of production.

As understood by one skilled in the art, the term "creep" refers a time-dependent deformation under a continuously applied load. As used herein, the term "creep strain resistance" refers to the time taken by the sample to reach a certain deformation threshold when treated with a continuously applied load at a specific temperature. The creep strain resistance may be measured by standard methods such as ASTM D2990, DIN EN ISO 899-1, or DIN 53444.

Another aspect of the invention relates to a method for preparing the high molecular weight polypropylene-based composition, comprising polymerizing propylene and ethylene, if present, with a Ziegler-Natta catalyst system to form the high molecular weight polypropylene-based composition. The Ziegler-Natta catalyst system may contain phthalates or be a non-phthalate system.

Various Ziegler-Natta procatalyst known in the art for polymerizing propylene and ethylene may be used in the catalyst system, although other catalyst systems may be used as well. The Ziegler-Natta procatalyst composition typically contains a transition metal compound and a Group 2 metal compound. The transition metal compound may be a solid complex derived from a transition metal compound, for example, titanium-, zirconium-, chromium- or vanadium-hydrocarbyloxides, hydrocarbyls, halides, or mixtures thereof. In a typical Ziegler-Natta procatalyst composition, the transition metal is titanium, the Group 2 metal is magnesium, and the halogen is chloride.

The transition metal compound may have the general formulas of $TrX_x$ or $Tr(OQ)_gX_{4-g}$. Tr is the transition metal, for instance, Tr may be a Group 4, 5, or 6 metal. In one embodiment, Tr is a Group 4 metal, such as titanium. In another embodiment, Tr is Group 5 metal, such as vanadium. Each Q independently represents a hydrocarbon group, such as a $C_1$-$C_{10}$ alkyl group. X represents a halogen atom, such as chloride, bromide, or iodide; x is an integer from 3 to 4; and g is an integer from 0 to 4. Exemplary transition metal compounds include, but are not limited to, titanium trihalides such as $TiCl_3$, $TiBr_3$, and $TiI_3$; titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(OC_4H_9)Cl_3$, $Ti(OC_2H_5)Br_3$, and $Ti(OC_4H_9)Br_3$; dialkoxytitanium dihalides such as $Ti(OCH_3)_2Cl_2$, $Ti(OC_2H_5)_2Cl_2$, $Ti(OC_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(OC_4H_9)_3Cl$, and Ti(OC$_2$H$_5$)$_3$Br; and tetraalkoxytitaniums such as Ti(OCH$_3$)$_4$, Ti(OC$_2$H$_5$)$_4$ and Ti(OC$_4$H$_9$)$_4$. Mixtures of two or more such transition metal compounds may be used as well. The transition metal compound may be used individually or in solutions of hydrocarbon compounds or halogenated hydrocarbons.

Suitable Group 2 metal compounds include, but are not limited to, magnesium halides, such as magnesium chloride and magnesium bromide; alkoxymagnesiums, such as ethoxymagnesium, isopropoxymagnesium, butoxymagnesium, and 2-ethylhexoxymagnesium; dialkoxymagnesiums, such as diethoxymagnesium; alkoxymagnesium halides, such as methoxymagnesium chloride, ethoxymagnesium chloride, isopropoxy magnesium chloride, butoxy magnesium chloride, and octoxy magnesium chloride; magnesium oxyhalides; dialkylmagnesiums; aryloxymagnesiums, such as phenoxymagnesium and methylphenoxy magnesium chloride; and carboxylates of magnesium, such as magnesium laurate and magnesium stearate. These magnesium compounds may be in the liquid or solid state. Typically, the Group 2 metal compound is magnesium dichloride.

The Ziegler-Natta procatalyst composition may include an internal electron donor. Suitable internal electron donors include, but are not limited to, diethers, diesters, cyclic diesters, and succinates, and combinations thereof. The catalyst system may also include one or more external electron donor compounds.

The Ziegler-Natta procatalyst composition can be activated with organoaluminum compounds such as trialkylaluminum compounds (e.g., triethylaluminum, TEAL).

Any kind of polymerization process suitable for preparing a polyolefin can be used. The polymerization can be carried out, for example, in bulk phase using a liquid monomer (e.g., propylene) as a reaction medium, in slurry using an inert liquid (e.g., hydrocarbon) as a diluent, in solution using either monomers or inert hydrocarbons as solvent for the nascent polymer, or in gas phase, operating in one or more fluidized or mechanically agitated bed reactors. The high molecular weight polypropylene-based composition may be prepared by mixing a synthesized high molecular weight polypropylene homopolymer (or a polypropylene-polyethylene copolymer) with a synthesized average molecular weight polypropylene homopolymer, and/or a synthesized average molecular weight polypropylene-polyethylene copolymer. The methods to mix polymers are known to one skilled in the art and include solution blending. In some embodiments, the polymerization process is carried out in industrial loop reactors, such as a Spheripol reactor and a Spherizone reactor, in which the mixing of the high molecular weight homopolymer/copolymer with the average molecular weight homopolymer/copolymer occurs concurrently with the synthesis of the average molecular weight homopolymer/copolymer. The polymer components of the high molecular weight polypropylene-based composition may be synthesized in the loop reactors only or in the loop reactors and the gas phase reactor. In some embodiments where the gas phase reactor is used, the concentration of hydrogen in the gas phase reactor can range from about 50 ppm to about 200 ppm, from about 80 ppm to about 170 ppm, or from about 110 ppm to about 160 ppm. A gas phase ratio (C2/(C2+C3)) may range from about 0.01 to about 0.2, or from about 0.02 to 0.11.

The high molecular weight polypropylene-based composition is extruded by means known in the art using an extruder or other apparatus. The term "extruder" takes on its broadest meaning and includes any machine suitable for polyolefin extrusion. For instance, the term includes machines that can extrude polyolefin in the form of powder or pellets, sheets, fibers, or other desired shapes and/or profiles. The diameter of the extruder may range from about 8 mm to more than about 320 mm. Generally, an extruder operates by feeding material through the feed throat (an opening near the rear of the barrel) which comes into contact with one or more screws. The rotating screw(s) forces the polyolefin forward into one or more heated barrels (e.g., there may be one screw per barrel). The heated barrels may rotate at a speed of from about 25 rpm to about 1,200 rpm. The extrusion temperature may range from 240° C. to 290° C., although temperatures outside this may be suitable, depending on the physical and chemical properties of the composition. In many processes, a heating profile can be set for the barrel in which three or more independent proportional-integral-derivative controller (PID)-controlled heater zones can gradually increase the temperature of the barrel from the rear (where the plastic enters) to the front. Depending on the size of the extrusion equipment, the extrusion rate may range from about 3 kg/hr to over 4,500 kg/hr. The extrusion intensity can be adjusted to low, medium, or high.

The vessel can be, for instance, a single-screw or a twin-screw extruder, or a batch mixer. Further descriptions about extruders and processes for extrusion can be found in U.S. Pat. Nos. 4,814,135; 4,857,600; 5,076,988; and 5,153,382; all of which are incorporated herein by reference.

Accordingly, another aspect of the invention relates to a high molecular weight polypropylene-based composition formed by a process including: (1) polymerizing propylene and ethylene with a Ziegler-Natta catalyst system in a first loop reactor to form a high molecular weight polypropylene-polyethylene copolymer, (2) polymerizing propylene with the Ziegler-Natta catalyst system in a second loop reactor to form an average molecular weight polypropylene polymer, and (3) extruding the high molecular weight polypropylene-based composition. In some embodiments, the process further comprises mixing the high molecular weight polypropylene-polyethylene copolymer and the average molecular weight polypropylene polymer before the extruding step. The composition contains from 0 to about 0.5%, from about 0.10% to about 0.5%, or from about 0.2% to about 0.35% by weight ethylene. The loop reactor split, which is the ratio of the amount of the high molecular weight polypropylene-polyethylene copolymer to the amount of the average molecular weight polypropylene homopolymer, can range from about 30:70 to about 80:20, or from about 50:50 to 70:30. The composition has a melt flow rate of about 1.0 g/10 min or lower. The nucleation density can be greater than 18,000 nuclei/cm$^2$, greater than 75,000 nuclei/cm$^2$, or greater than 125,000 nuclei/cm$^2$, when nuclei are grown from a melt at 135° C. without the addition of an external nucleating agent, as measured by optical microscopy. A crystallization half time may be about 20 minutes or shorter, or about 10 minutes or shorter, when nuclei are grown from a melt at 135° C., as measured by isothermal differential scanning calorimetry. In another embodiment, the crystallization half time is from about 0.1 minute to 0.5 minute, when nuclei are grown from a melt at 120° C., as measured by isothermal differential scanning calorimetry.

Another aspect of the invention relates to a high molecular weight polypropylene-based composition formed by a process including: (1) polymerizing propylene with a Ziegler-Natta catalyst system in a first loop reactor, to form a high molecular weight polypropylene polymer, (2) polymerizing propylene with the Ziegler-Natta catalyst system in a second loop reactor, to form an average molecular weight polypropylene polymer, (3) optionally polymerizing propylene and ethylene with a Ziegler-Natta catalyst system in a gas phase reactor, to form an average molecular weight polypropylene-polyethylene copolymer, and (4) extruding the high molecular weight polypropylene-based composition. In some embodiments, the process further comprises mixing the high molecular weight polypropylene polymer, the average molecular weight polypropylene polymer, and the average molecular weight polypropylene-polyethylene copolymer, if present, before the extruding step. The composition can include from 0 to about 2%, from 0.1% to about 1.0%, or from 0.2 to about 0.6% by weight ethylene. The ratio of the amount of the high molecular weight polypropylene homopolymer to the amount of the average molecular weight polypropylene homopolymer can range from about 30:70 to about 80:20, or from about 50:50 to about 70:30. The melt flow rate can be about 1.0 g/10 min or lower, or about 0.4 g/10 min or lower. The nucleation density can be greater than 18,000 nuclei/cm$^2$ or 20,000 nuclei/cm$^2$, when nuclei are grown from a melt at 135° C. without the addition of an external nucleating agent, as measured by optical microscopy.

In some embodiments, the optional step of polymerizing propylene and ethylene with a Ziegler-Natta catalyst system in a gas phase reactor to form an average molecular weight polypropylene-polyethylene copolymer is present. In a further embodiment that includes the gas-phase-reactor polymerization, the composition comprises from about 0.25% to about 0.75% by weight ethylene. The amount of average molecular weight polypropylene-polyethylene copolymer ranges from about 5% to about 40%, or from 10% to 20% by weight, based on a total weight of the composition. A crystallization half time is about 15 minutes or shorter, when nuclei are grown from a melt at 135° C., as measured by isothermal differential scanning calorimetry. Alternatively, the crystallization half time can be from about 0.1 minute to 0.5 minute, when nuclei are grown from a melt at 120° C., as measured by isothermal differential scanning calorimetry.

The polymer compositions of the present invention can include any conventional plastics additives in any combination. The amount should not be wasteful of the additive. Those skilled in the art of thermoplastics compounding, with reference to such treatises as Plastics Additives Database (2004) from Plastics Design Library (www.elsevier.com), can select from many different types of additives for inclusion into the compounds of the present invention.

Non-limiting examples of additives or oligomers are adhesion promoters; antioxidants (e.g., antioxidants containing thioether, phosphite, or phenolic units); flame retardants; biocides (antibacterials, fungicides, and mildewcides); anti-fogging agents; anti-static agents; bonding, blowing and foaming agents; dispersants; fillers (e.g., glass fibers) and extenders; smoke suppressants; expandable char formers; impact modifiers; initiators; acid scavengers; lubricants; micas; pigments, colorants and dyes; plasticizers; processing aids; other polymers; release agents; silanes, titanates and zirconates; additional slip agents; anti-blocking agents; stabilizers such as hindered amine light stabilizers; stearates (e.g., calcium stearate); ultraviolet light absorbers; viscosity regulators; waxes; antiozonants, organosulfur compounds, and combinations thereof.

In one embodiment, an additive package includes calcium stearate, a thioether antioxidant (e.g., DSTDP), a phenolic antioxidant (e.g., AO 1010), and a phosphite antioxidant (e.g., AO 626). In another embodiment, the additive package includes an acid scavenger (e.g., DHT-4V), DSTDP, AO 1010, and AO 626. In yet another embodiment, the additive package includes DHT-4V, DSTDP, and AO 626.

Antiblock additives are often used together with slip additives and for their complementary functions. Antiblock additives reduce adhesion or the "stickiness" between polymer layers (usually layers of the same polymer), which is created by blocking forces inherent to many polymers. Whereas slip additives decrease friction caused from moving across the surface of a polymer, antiblock additives create a microrough surface that lessens the adhesion caused by these blocking forces. Antiblock additives, like slip additives, are commonly used to improve the handling of a polymer for applications such as packaging. For instance, a non-migratory antiblock additive, such as crosslinked poly (methyl methacrylate) or inorganic silica, can be used.

Antioxidants and flame retardants are commonly used to improve the oxidation resistance and to reduce the flammability of the polymers for under-the-hood applications; i.e., automotive applications in which the part or component is located under the hood or otherwise suitable for use near an engine.

Another aspect of the disclosure relates to an article prepared from the high molecular weight polypropylene-based composition. The article includes cast films, blown films, oriented films, sheets, and fibers. In some embodiments, the article may be a fabricated article.

A combination of factors, such as the high nucleation density in the presently disclosed compositions, and the presence of high molecular weight polymers (i.e., polypropylene homopolymer or polypropylene-polyethylene copolymer) can lead to an improved composition. Accordingly, the article may be suitable for applications that operate over a broad temperature range for a long duration. Such applications include pipe and automotive applications that typically run at high temperatures and pressures. In some embodiments, the article may be useful for under-the-hood surge tanks. A surge tank helps regulate the cooling system fluid level in automobiles and provide a place for coolant expansions or contractions. The entire surge tank can be composed of the same composition. The size and shape of the surge tank can vary depending on manufacturer's objectives and material selection. Accordingly, one aspect of the disclosure relates to an under-the-hood surge tank prepared from the high molecular weight polypropylene-based composition.

The fabricated article may be formed by a process such as injection molding, thermoforming, blow molding and processing equipment with foaming capability.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

EXAMPLES

The following examples are given as particular embodiments of the invention and to demonstrate the practice and advantages thereof. It is to be understood that the examples are given by way of illustration and are not intended to limit the specification or the claims that follow in any manner.

Experimental Method

High molecular weight polymer chains were produced in the first loop reactor of a two loop reactor Spheripol asset with gas phase reactor optionality. This step was accomplished through low hydrogen addition of approximately 40 ppm to the first loop reactor. The high molecular weights of these polymers were reflected in the low melt flow rate ("MFR") in Table 1.

Compositions based on Material A contained first loop materials that contained ethylene, and are listed as Examples 1-3. Example 4, a composition based on Material B, contains first loop and second loop materials composed of polypropylene homopolymers (bimodal) and a polypropylene-polyethylene copolymer composition made in the gas phase reactor.

The melt flow rates ("MFRs") for the first loop materials for Material A ranged from 0.06 g/10 min to 0.1 g/10 min with a 2.16 kg melt indexer weight and from 0.12 g/10 min to 0.24 g/10 min for a 5 kg melt indexer weight. The MFRs for the first loop materials for Material B had a melt flow of approximately 0.2 g/10 min using a 5 kg melt indexer weight. For the MFR measurement, the materials may contain a stabilizer, such as an antioxidant, butylated hydroxytoluene (BHT), at about 1 wt %.

The MFRs for the second loop materials increased as additional hydrogen was added to the reactor. For Material A, second loop hydrogen was added at a concentration of roughly 600 ppm. The second loop MFR, the final MFR, ranged from 0.1 g/10 min to 0.26 g/10 min with a 2.16 kg weight and 0.68 g/10 min to 1.0 g/10 min when using a 5 kg weight. The ratio of the amount of the first loop material to the amount of the second loop material was about 60:40. Final ethylene contents for compositions based on Material A ranged from 0.1 wt % to 0.5 wt %.

For Material B, second loop hydrogen was added at a concentration from 3,024 to 4,253 ppm. Compositions based on Material B yielded a MFR up to 0.52 g/10 min with a 2.16 kg weight and up to 3 g/10 min when using a 5 kg weight. Material B with homopolymer loops also included a polypropylene-polyethylene copolymer made in the gas phase reactor. Final weight percentages ethylene for compositions based on Material B ranged from roughly 0.5 to 2. Final MFRs ranged from 0.33 g/10 min to 0.47 g/10 min using a 2.16 kg weight and 1.5 g/10 min to 3.1 g/10 min when using a 5 kg weight. The ratio of the amount of the first loop material to the amount of the second loop material was about 60:40, and the amount of the gas phase reactor material was about 10 wt %.

Nucleation Density

The nucleation density, represented as nuclei/cm$^2$, was measured on pressed films. Resin pellets were heated to 200° C. between two sheets of aluminum foil in a Carver platen press at 8 tons for 3 minutes. Films were then removed, cut to size, and placed between a glass slide base and glass coverslip. The assembled slide was then heated to 230° C. for 5 minutes to melt the pressed film after which the slide assembly was placed in a hot stage at the called out temperature per Table 1. A confocal microscope equipped with crossed polarizers and a digital camera was then set up to automatically take pictures of the sample as it crystallized. Using a scale bar, nuclei were counted using a software, Hirox Advanced Image Analysis Software, bundled with the optical microscope. The nucleation density was then calculated per square area of the scale bar used. After which, nucleation density was converted to a standard cross-sectional area of 1 cm$^2$.

Crystallization Half Times

Crystallization half times were calculated from isothermal DSC (ISO DSC) scans. Samples were pressed between two sheets of aluminum foil in a Carver platen press using 2 metric tons for 30 seconds to initially melt the sample. After this point, 5½ metric tons of pressure was applied for 5 minutes at a press temperature of 200° C. Films were then removed and cut to size for placement in DSC TA TZero aluminum analysis pans. Cut films weighed approximately 6.5 mg.

The ISO DSC was run per the following program in a TA Instruments Q200 unit:

Equilibrate at 200.00° C.

Isothermal for 5.00 min

Ramp (i.e., cool at) 30.00° C./min to the desired isothermal temperature (120.00° C. or 135° C.)

Isothermal up to 120.00 min

Raw ISO DSC data was then taken and analyzed per the following steps:

Starting time, Time Zero, of the crystallization half time was calculated to be the time at which the unit reached the desired isothermal temperature or the minimum Heat Flow (W/g) reached between equilibrium at 200° C. and the Heat Flow (W/g) of peak crystallization.

Crystallization half time was calculated from Time Zero to time of peak Heat Flow (W/g).

Shape of the Crystals

Figure 2:
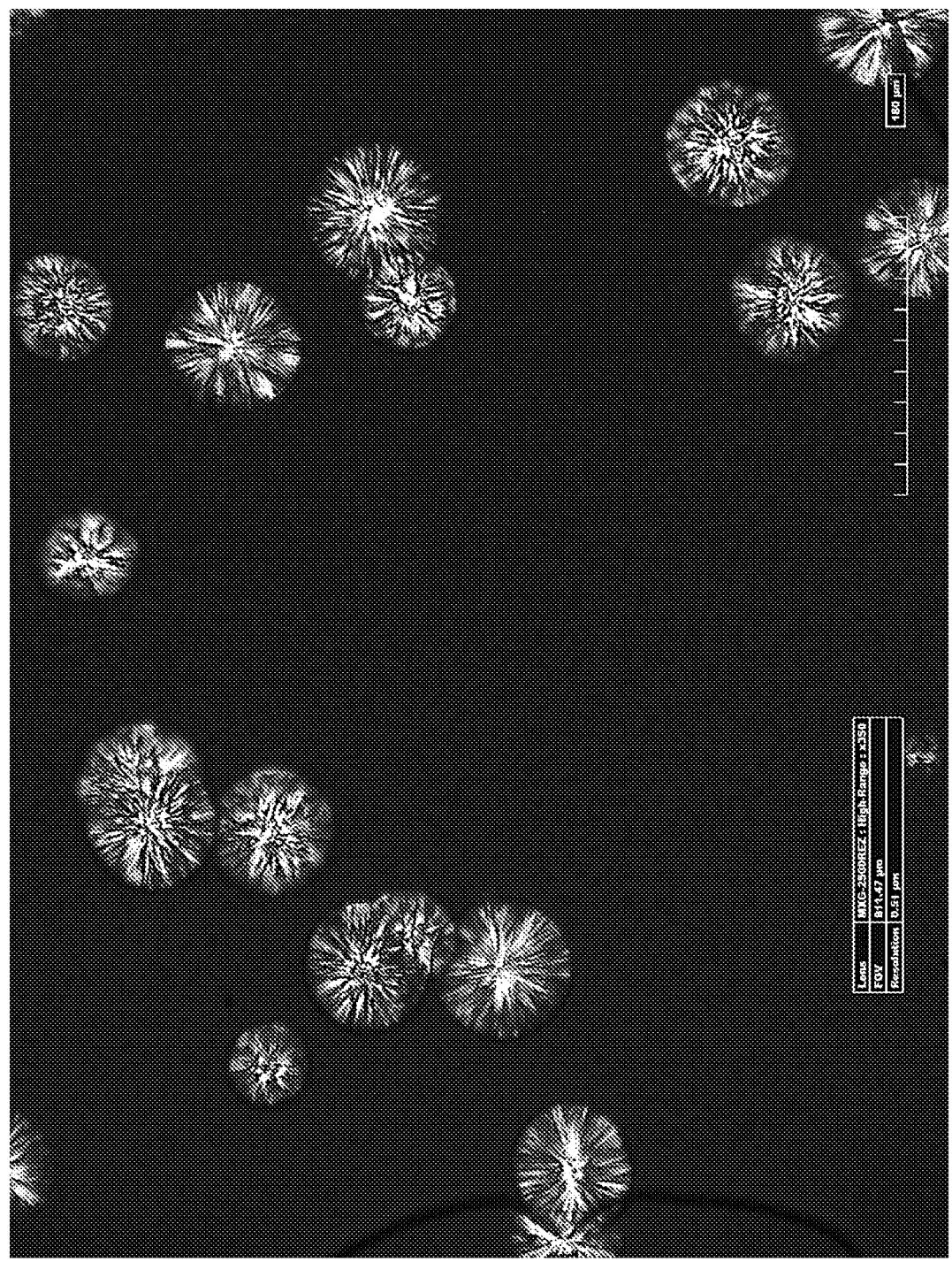
FIG. 2 is an optical micrograph showing the spherulitic crystals formed in Comparative Example 3.

The compositions based on Materials A and B formed cylindritic crystals (see FIG. 1) that may develop into typical spherulitic crystals depending on the nucleation density and crystal growth rates (i.e. crystal impingement). FIG. 2 shows the typical spherulitic crystals in Comparative Example 3.

High Nucleation Densities and Short Crystallization Half Times

Table 1 summarizes the DSC and optical microscopy crystallization data. Applicants achieved high nucleation densities for Examples 1-5. These high nucleation densities led to significantly reduced crystallization half times for all compositions made in accordance with the invention.

Comparative Example 1 is an impact copolymer in which the ethylene is present in the form of propylene-ethylene rubber chains, and has a homopolymer matrix, which crystallizes from the polymer melt. Comparative Examples 2 and 3 are random propylene-ethylene copolymers. Although Comparative Examples 1-3 exhibited similar nucleation densities, Comparative Example 1 had a shorter crystallization half time than Comparative Examples 2 and 3. This result was expected because the incorporation of ethylene in the random copolymer chains of Comparative Examples 2 and 3 likely slowed down crystal growth.

However, Examples 1-4, which contained ethylene in the polymer chains, unexpectedly exhibited shorter crystallization half times than Comparative Example 1, as well as Comparative Examples 2 and 3. This observation was attributed to the high nucleation density of the compositions.

High nucleation density was found to be achievable without processing, for example, without applying external shearing forces. Thus, for at least Example 5, the driving force may be the bimodal molecular weight distribution in which one mode corresponded to a high molecular weight.

TABLE 1

Melt flow rate, ethylene content, crystallization half time, and nucleation density for presently disclosed polymer compositions and comparative examples

| Example | MFR | Material Type | Total Ethylene, wt % | 120° C. Crystal Half Time, min | 120° C. Nucleation Density, Nuclei/cm$^2$ | 135° C. Crystal Half Time, min | 135° C. Nucleation Density, Nuclei/cm$^2$ |
|---|---|---|---|---|---|---|---|
| Example 1 | 0.1 | Material A | ~0.2 | 0.22 | 1,234,957 | 8.51 | 378,106 |
| Example 2 | 0.4 | Material A | ~0.2 | 0.25 | NM | 9.49 | 127,626 |
| Example 3 | 0.2 | Material A | ~0.3 | 0.46 | NM | 16.93 | 84,133 |
| Example 4 | 0.3 | Material B | ~0.5 | 0.40 | NM | 14.28 | 21,952 |
| Example 5 | 0.3 | Homopolymer matrix of Material B | 0 | NM | 102,694 | NM | 19,782 |
| Comparative Example 1 | 0.3 | Impact copolymer, homopolymer matrix | 0 | 0.75 | NM | 27.37 | 8,107 |
| Comparative Example 2 | 0.6 | Mini random copolymer | 0.5 | 1.49 | 26,241 | 51.86 | 7,068 |
| Comparative Example 3 | 0.2 | Mini random copolymer | 0.4 | 1.53 | 32,706 | 68.90 | 6,747 |

NM = Not measured

We claim:

1. A high molecular weight polypropylene-based composition, comprising from 0 to about 2% by weight ethylene;
   wherein the composition has a melt flow rate of about 1.0 g/10 min or lower, measured
   with a 2.16 kg melt indexer weight at 230° C.; and
   wherein the composition has a nucleation density greater than 18,000 nuclei/cm$^2$, measured by growing the nuclei from a melt of the composition at 135° C. without the addition of an external nucleating agent, as measured by optical microscopy.

2. The composition of claim 1, wherein the composition comprises from about 0.1% to about 1.0% by weight ethylene.

3. The composition of claim 1, wherein the melt flow rate is about 0.5 g/10 min or lower, measured with a 2.16 kg melt indexer weight at 230° C.

4. The composition of claim 1, wherein the nucleation density is greater than 100,000 nuclei/cm$^2$.

5. The composition of claim 1, wherein the composition has a crystallization half time of about 24 minutes or shorter, measured by growing the nuclei from a melt of the composition at 135° C., as measured by isothermal differential scanning calorimetry.

6. The composition of claim 5, wherein the crystallization half time is about 15 minutes or shorter.

7. The composition of claim 1, wherein the composition has a crystallization half time ranging from about 0.1 minute to about 0.9 minute, measured by growing the nuclei from a melt of the composition at 120° C., as measured by isothermal differential scanning calorimetry.

8. The composition of claim 7, wherein the composition comprises from about 0.1% to about 1.0% by weight ethylene.

9. A method for preparing the high molecular weight polypropylene-based composition of claim 1, the method comprising:
   polymerizing propylene and ethylene, if present, with a Ziegler-Natta catalyst system to form the high molecular weight polypropylene-based composition; and
   extruding the high molecular weight polypropylene-based composition.

10. An article prepared from the high molecular weight polypropylene-based composition of claim 1.

11. The article of claim 10, wherein the high molecular weight polypropylene-based composition comprises from about 0.1% to about 1.0% by weight ethylene.

12. The article of claim 10, wherein the article is a fabricated article.

13. The article of claim 10, wherein the article is an under-the-hood surge tank or a pipe.

14. A high molecular weight polypropylene-based composition formed by a process comprising:
   polymerizing propylene and ethylene with a Ziegler-Natta catalyst system in a first loop reactor to form a high molecular weight polypropylene-polyethylene copolymer;
   polymerizing propylene with the Ziegler-Natta catalyst system in a second loop reactor to form an average molecular weight polypropylene polymer; and
   extruding the high molecular weight polypropylene-based composition;
   wherein the composition comprises from about 0.10% to about 0.5% by weight ethylene;
   wherein the composition has a melt flow rate of about 1.0 g/10 min or lower, measured with a 2.16 kg melt indexer weight at 230° C.; and
   wherein the composition has a nucleation density greater than 18,000 nuclei/cm$^2$, measured by growing the nuclei from a melt of the composition at 135° C. without the addition of an external nucleating agent, as measured by optical microscopy.

15. The composition of claim 14, the process further comprising mixing the high molecular weight polypropylene-polyethylene copolymer and the average molecular weight polypropylene polymer before the extruding step.

16. The composition of claim 14, wherein the nucleation density is greater than 75,000 nuclei/cm$^2$.

17. The composition of claim 16, wherein the nucleation density is greater than 125,000 nuclei/cm$^2$.

18. The composition of claim 14, wherein the composition comprises from about 0.2% to about 0.35% by weight ethylene.

19. The composition of claim 18, wherein the composition has a crystallization half time of about 20 minutes or shorter, measured by growing the nuclei from a melt of the composition at 135° C., as measured by isothermal differential scanning calorimetry.

20. The composition of claim 18, wherein the composition has a crystallization half time of about 10 minutes or shorter, measured by growing the nuclei from a melt of the composition at 135° C., as measured by isothermal differential scanning calorimetry.

21. The composition of claim 18, wherein the composition has a crystallization half time of from about 0.1 minute to 0.5 minute, measured by growing the nuclei from a melt of the composition at 120° C., as measured by isothermal differential scanning calorimetry.

22. A high molecular weight polypropylene-based composition formed by a process comprising:
polymerizing propylene with a Ziegler-Natta catalyst system in a first loop reactor, to form a high molecular weight polypropylene polymer;
polymerizing propylene with the Ziegler-Natta catalyst system in a second loop reactor, to form an average molecular weight polypropylene polymer;
optionally polymerizing propylene and ethylene with a Ziegler-Natta catalyst system in a gas phase reactor, to form an average molecular weight polypropylene-polyethylene copolymer; and
extruding the high molecular weight polypropylene-based composition;
wherein the composition comprises from 0 to about 2% by weight ethylene;
wherein the composition has a melt flow rate of about 1.0 g/10 min or lower, measured with a 2.16 kg melt indexer weight at 230° C.; and
wherein the composition has a nucleation density greater than 18,000 nuclei/cm$^2$, measured by growing the nuclei from a melt of the composition at 135° C. without the addition of an external nucleating agent, as measured by optical microscopy.

23. The composition of claim 22, the process further comprising mixing the high molecular weight polypropylene polymer, the average molecular weight polypropylene polymer, and the average molecular weight polypropylene-polyethylene copolymer, if present, to form the high molecular weight polypropylene-based composition before the extruding step.

24. The composition of claim 23, wherein the nucleation density is greater than 20,000 nuclei/cm$^2$.

25. The composition of claim 23, wherein the optional step of polymerizing propylene and ethylene with a Ziegler-Natta catalyst system in a gas phase reactor to form an average molecular weight polypropylene-polyethylene copolymer is present.

26. The composition of claim 25, wherein the composition has a crystallization half time of about 15 minutes or shorter, measured by growing the nuclei from a melt of the composition at 135° C., as measured by isothermal differential scanning calorimetry.

27. The composition of claim 25, wherein the composition has a crystallization half time of from about 0.1 minute to 0.5 minute, measured by growing the nuclei from a melt of the composition at 120° C., as measured by isothermal differential scanning calorimetry.

28. The composition of claim 22, wherein the composition comprises from about 0.1% to about 1.0% by weight ethylene.

* * * * *